(No Model.)

J. W. McDONOUGH.
PHOTOGRAPHIC PRINTING FRAME.

No. 561,685. Patented June 9, 1896.

Witnesses:

Inventor:
James W. McDonough,
By Banning & Banning & Sheridan,
Attys.

UNITED STATES PATENT OFFICE.

JAMES W. McDONOUGH, OF CHICAGO, ILLINOIS.

PHOTOGRAPHIC-PRINTING FRAME.

SPECIFICATION forming part of Letters Patent No. 561,685, dated June 9, 1896.

Application filed May 8, 1895. Serial No. 548,529. (No model.)

*To all whom it may concern:*

Be it known that I, JAMES W. McDONOUGH, a citizen of the United States, residing at Chicago, Illinois, have invented certain new and useful Improvements in Photographic-Printing Frames, of which the following is a specification.

The object of my present invention has more particular reference to the means for effecting the proper registration of the patterns employed on the negative or positive plates and the paper on which the printing is done; and my invention consists in the features, combinations, and arrangements hereinafter described and claimed.

Figure 1:
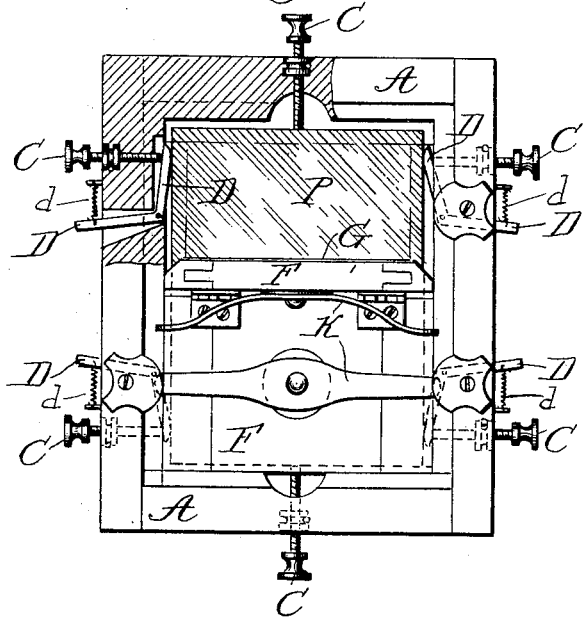
Figure 2:
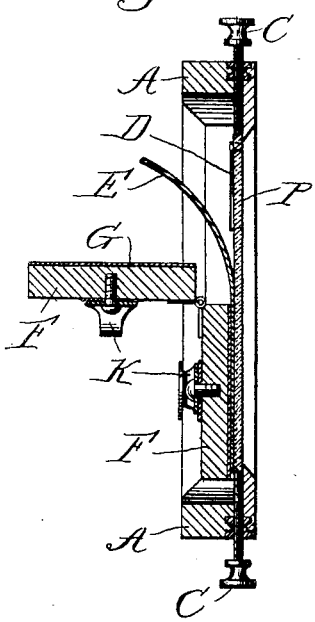

In the drawings, Figure 1 is a plan view of my improved printing-frame, and Fig. 2 a side elevation of a transverse section through the frame.

In carrying out or effecting my process for producing colored pictures by the aid of photography I obtain a negative or positive in lines or patterns corresponding to the action of different-colored light from the object photographed in alternating lines or patterns. These lines or patterns are minute or microscopic in size. From this negative or positive, according to the process of printing used, I print a positive picture by placing the negative or positive over and in contact with paper or other suitable material, ruled or printed in alternate lines or patterns to correspond in register with the negative or positive, and sensitized with one of the sensitizing compounds or solutions usually employed for such purpose. After the printing, as in any of the ordinary printing processes, the picture is toned, fixed, and mounted.

Let us assume, for the sake of clearness of description, that the colors used upon the paper in alternating lines are yellowish red, yellowish green, and violet blue in such proportions as to present to the eye a light-colored, gray, or neutral tint. These lines or patterns are not seen as separate colors by the naked eye in the paper to be printed upon, but if covered with a transparent plate upon which are ruled or printed, or a negative upon which are impressed by light, opaque lines or patterns registering in form and size with two of the colored lines in each series upon the paper and the third left transparent one of the colored lines will show through and the other two will be suppressed or invisible. In order to register the lines of the negative with the lines of the paper to be printed upon, I have invented a printing-frame which I have illustrated in the drawings and will describe in the specification.

In the drawings, A is a box or frame having a recess in which is placed a negative or positive plate P, from which the impression or print is intended to be made.

C C are adjusting-screws passing through the sides of the frame in such position that their points either press against the negative or upon the movable parts of the levers D D on one or two sides, as may be preferred. The levers D D are held against the plate P by follower-springs *d*. These springs may be of sufficient strength to enable the adjusting-screws to be dispensed with on one side and the springs alone relied on. In this case the operation of the springs would be to push the plate toward the opposite side of the frame and the screws there could be used to adjust the plate back against the pressure of the springs to the desired point.

E is the paper or material to be printed upon, which is in contact with the negative or positive, as in the ordinary photographic-printing frame. It is obvious that these adjusting-screws may be arranged so as to move the paper instead of the negative or positive plate, if preferred. By the use of the screws or other means for moving and adjusting the parts the plate or paper may be shifted or turned, so as to cause the lines of the negative to register with those of the paper.

F is a hinged cover for holding the paper in contact with the negative. This cover may be faced with rubber G or other material having a rough or tacky surface to hold the paper and prevent it from shifting or expanding.

K K are springs fixed to the cover to hold the cover and plate in close contact.

Let us take, for clearness of description, an example where the paper is ruled in three alternating lines—say three hundred to the inch—in red, green, and blue and sensitized with a material which will print or change to black in sunlight, and the plate registers with it in lines obtained by the action of light from the object photographed in lines or bands corresponding in color and alternation with those of the paper. This plate or negative develops opaque or proportionately obscure where light has acted and transparent in proportion to the non-action of light, and we wish to print a positive picture in colors from it. In order to do this, we put the negative in the printing-frame so that the silver surface or picture will come in contact with the colored surface of the sensitized paper and press them in close contact. We use the adjusting-screws C C to make the lines parallel and register the colors. With this arrangement we cover the colored lines we wish to show in the finished picture and leave uncovered those we wish to obscure. The picture we see through the negative before printing is in complementary colors. For instance, a red object will appear of the complementary green through the negative. When the picture is exposed and printed in the light and fixed, this green will be obscured and the red will be left visible, as is desired, and so with the other colors.

Where desired, we may obtain a negative by placing in the photographic camera a screen or plate ruled in fine alternating lines—say three hundred to the inch—of different transparent colors—say one of yellowish red, one of yellowish green, and one of violet-blue or their complementaries. In close contact with this screen we place an orthochromatic dry-plate, so that the light from the object photographed will pass through the colors of the screen to impress itself upon the negative plate. Each colored band is opaque to each of the others of different color, and when the negative is developed it is in lines, each corresponding to the action of the colored light passing through a single colored line of the screen.

When the positive is used to print a positive upon the colored paper, as in some direct processes, or when the positive is used to form a picture upon transparent colored material, as soon as the register is obtained by adjustment the picture shows in its proper colors and can be viewed through the glass.

What I regard as new, and desire to secure by Letters Patent, is—

1. A frame for holding or printing photographic pictures in colors, consisting of a receptacle for holding a negative or positive plate, a cover for holding a printing paper or material in contact with the plate provided with a surface of rough or tacky material next to and in contact with the paper or material to prevent the same from shifting or expanding while printing, and means for moving the plate or paper or material relatively to each other to cause lines or patterns on their faces to register with each other.

2. A frame for holding or printing photographic pictures in colors, consisting of a receptacle for holding a negative or positive plate, a cover for holding a printing paper or material in contact with the plate, and springs and screws operating in opposition to each other for moving the plate or paper or material relatively to each other to cause lines or patterns on their faces to register with each other.

JAMES W. McDONOUGH.

Witnesses:
 THOS. A. BANNING,
 THOMAS B. McGREGOR.